US006976451B2

(12) United States Patent
Helfman (10) Patent No.: US 6,976,451 B2
(45) Date of Patent: Dec. 20, 2005

(54) WASTE COLLECTION PAD (75) Inventor: Russel Helfman, Commack, NY (US)

(73) Assignee: United Pet Group, Inc., Hauppauge, NY (US)

( * ) Notice: Subject to any disclaimer, the term of this patent is extended or adjusted under 35 U.S.C. 154(b) by 0 days.

(21) Appl. No.: 10/722,028

(22) Filed: Nov. 25, 2003

(65) Prior Publication Data

US 2005/0109284 A1    May 26, 2005

(51) Int. Cl.⁷ .......................... A01K 29/00; A61F 13/15
(52) U.S. Cl. ....................................... 119/169; 604/386
(58) Field of Search ........................ 119/169, 526, 850, 119/854, 28.5, 161, 163, 165, 166; 604/370, 604/372, 386, 391

(56) References Cited

U.S. PATENT DOCUMENTS

| | | | | |
|---|---|---|---|---|
| 3,626,899 A | * | 12/1971 | Spellman | 119/169 |
| 3,752,121 A | * | 8/1973 | Brazzell | 119/169 |
| 4,800,677 A | * | 1/1989 | Mack | 119/171 |
| 4,934,316 A | * | 6/1990 | Mack | 119/169 |
| 5,220,884 A | * | 6/1993 | Townsend | 119/496 |
| 5,676,094 A | * | 10/1997 | Gun-Munro | 119/850 |
| 5,797,347 A | * | 8/1998 | Ochi | 119/169 |
| 5,819,688 A | * | 10/1998 | Walker | 119/169 |
| 5,954,015 A | * | 9/1999 | Ohta | 119/850 |
| 6,173,675 B1 | * | 1/2001 | Licciardo | 119/28.5 |
| 6,209,486 B1 | * | 4/2001 | Reynolds | 119/28.5 |
| 6,436,384 B2 | * | 8/2002 | Santoiemmo | 424/76.6 |
| 6,460,484 B2 | * | 10/2002 | Ikegami et al. | 119/169 |
| 6,532,897 B1 | * | 3/2003 | Adolfsson et al. | 119/168 |
| 6,553,938 B2 | * | 4/2003 | Ikegami et al. | 119/161 |
| 6,684,816 B2 | * | 2/2004 | Lippincott | 119/171 |
| 2003/0035929 A1 | * | 2/2003 | Weder | 428/194 |
| 2004/0022966 A1 | * | 2/2004 | Weder | 428/15 |

* cited by examiner

Primary Examiner—Yvonne R. Abbott
(74) Attorney, Agent, or Firm—Goodwin Procter LLP (57) ABSTRACT

There is provided herein an animal waste collection pad, comprising: a backing sheet of fluid impervious material, one or more absorbent sheets overlying the backing sheet, a top sheet overlying the absorbent sheet(s) and integrated tie means along one dimension of the collection pad. The tie means form ties for carrying and tying the collection pad into a compact bundle for disposal.

16 Claims, 7 Drawing Sheets

FIG. 8 ic # WASTE COLLECTION PAD

CROSS REFERENCE TO RELATED APPLICATION(S)/CLAIM OF PRIORITY

Not applicable

STATEMENT REGARDING FEDERALLY SPONSORED RESEARCH OR DEVELOPMENT

Not applicable.

REFERENCE OF AN APPENDIX

Not applicable.

BACKGROUND OF THE INVENTION

1. Field of the Invention

This invention generally relates to waste collection pads and, more particularly, to a animal waste collection pad having built-in ties for convenient disposal thereof.

2. Description of the Related Art

Examples of art related to this invention include the following patents and/or publications:

U.S. Pat. No. 3,626,899 entitled "Training Pads for Young Dogs" and incorporated in its entirety herein by reference, describes "an absorbent material lined on one side thereof with fluid impervious material [which] is impregnated with an odor imparting substances which attracts young dogs to the pads for the purpose of urination and defecation and discourages chewing of the pad by the young dog."

U.S. Pat. No. 4,800,677 entitled "Animal Waste Collection Pad" and incorporated in its entirety herein by reference, describes "an animal waste collection pad having a backing sheet of fluid impervious material, a non-woven top sheet thereon. An absorbent pad is disposed on the backing sheet and the pad contains a scent, attractive to dogs. The scent may be provided by a frangible capsule, a micro encapsulated scent incorporated in the pad or a spray applied to the pad. There are tapes or drawstrings attached to the backing sheet for tying the animal waste collection pad into a small compact package for disposal."

BRIEF SUMMARY OF THE INVENTION

The present invention is an improvement over existing animal waste collection pads and provides easy clean up and disposal thereof. Specifically and in accordance with one aspect of the present invention, there is provided a animal waste collection pad comprising: a top sheet, a backing sheet of fluid impervious material, one or more absorbent sheets disposed between the top sheet and the backing sheet and built-in ties.

Additional aspects, features and advantages of the present invention will become better understood with regard to the following description and accompanying drawings.

BRIEF DESCRIPTION OF THE DRAWINGS

Referring briefly to the drawings, exemplary embodiments of the present invention will be described with reference to the accompanying drawings in which.

DETAILED DESCRIPTION OF THE INVENTION

The aspects, features and advantages of the present invention will become better understood with regard to the following description with reference to the accompanying drawings. What follows are exemplary embodiments of the present invention.

Figure 1:
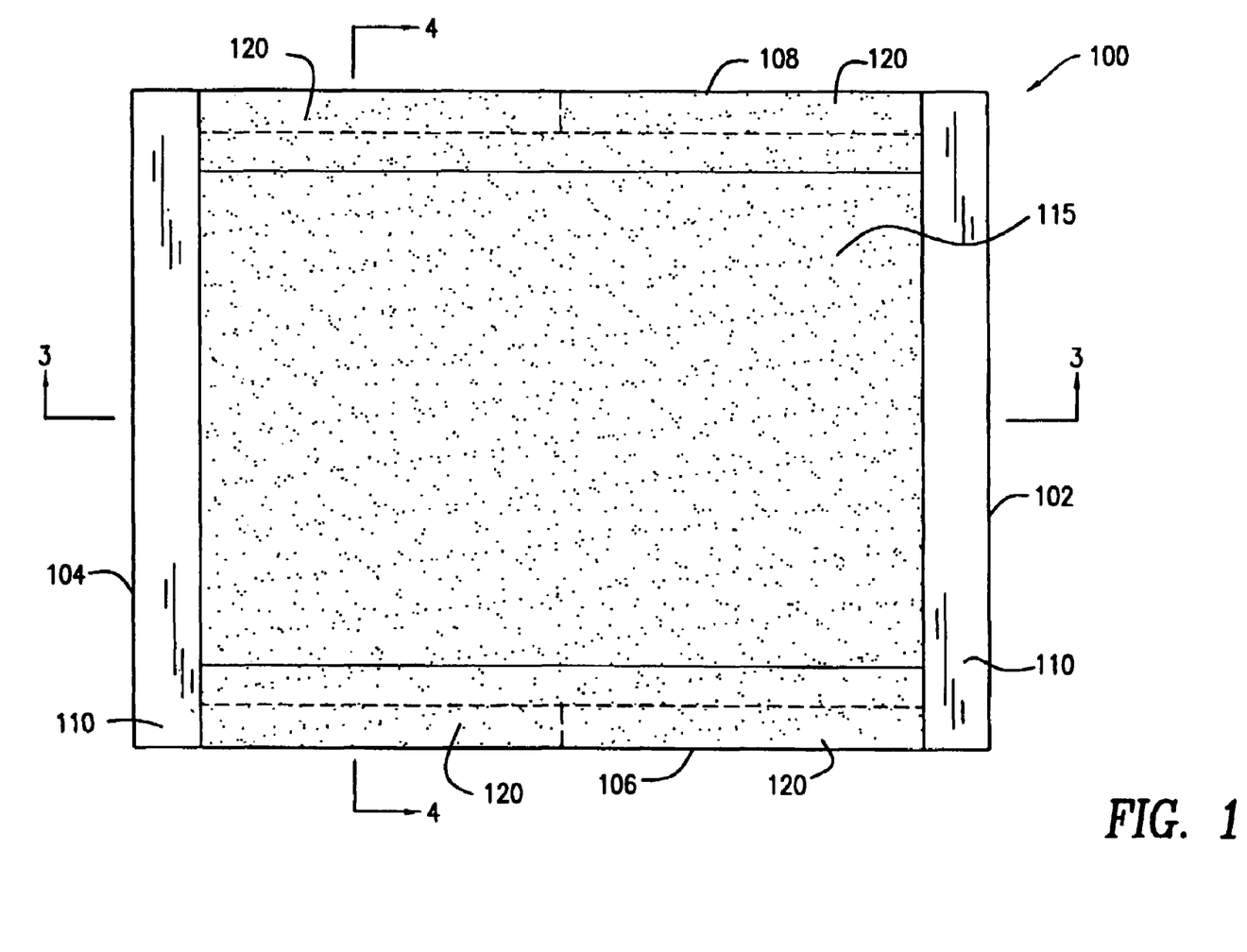
FIG. 1 shows a top plan view of a waste collection pad in accordance with the present invention.
Figure 2:
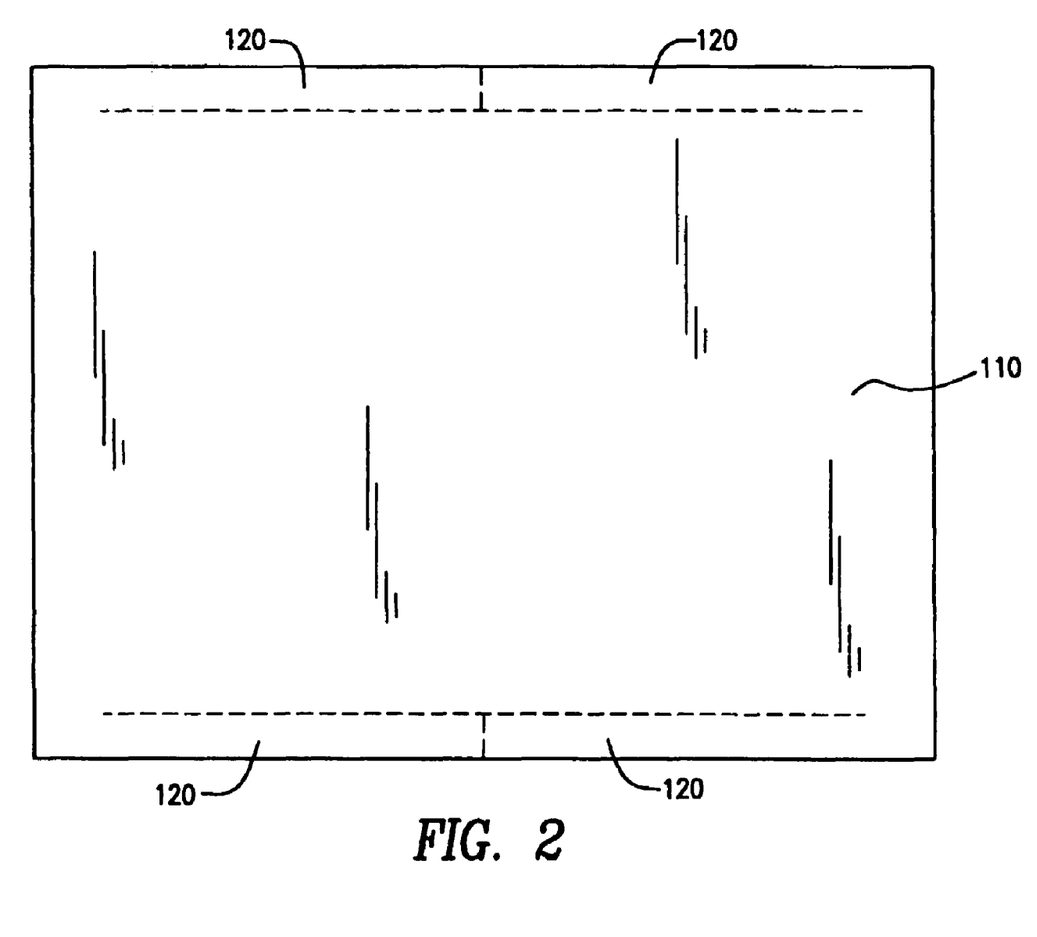
FIG. 2 shows a bottom plan view of the waste collection pad of FIG. 1.

FIGS. 1 and 2 depict exemplary embodiments of a waste collection pad 100 according to the principles expressed herein. As shown, the waste collection pad 100 is generally square or rectangular in shape, having first side edges 102 and 104 and second side edges 106 and 108. The waste collection pad 100 comprises: a backing sheet 110, one or more absorbent sheets 112, a top sheet 115 and integral ties or tapes 120.

The backing sheet 110 is preferably made of a fluid impervious material, such as polyethylene, polypropylene or other suitable fluid impervious material.

The one or more absorbent sheets 112 overlays the backing sheet 110 and are made from suitable absorbent material, such as crepe paper, wood fluff or other suitable absorbent material.

The top sheet 115 overlays the one or more absorbent sheets 112 and is preferably made from suitable woven or non-woven materials or the like.

Figure 5:
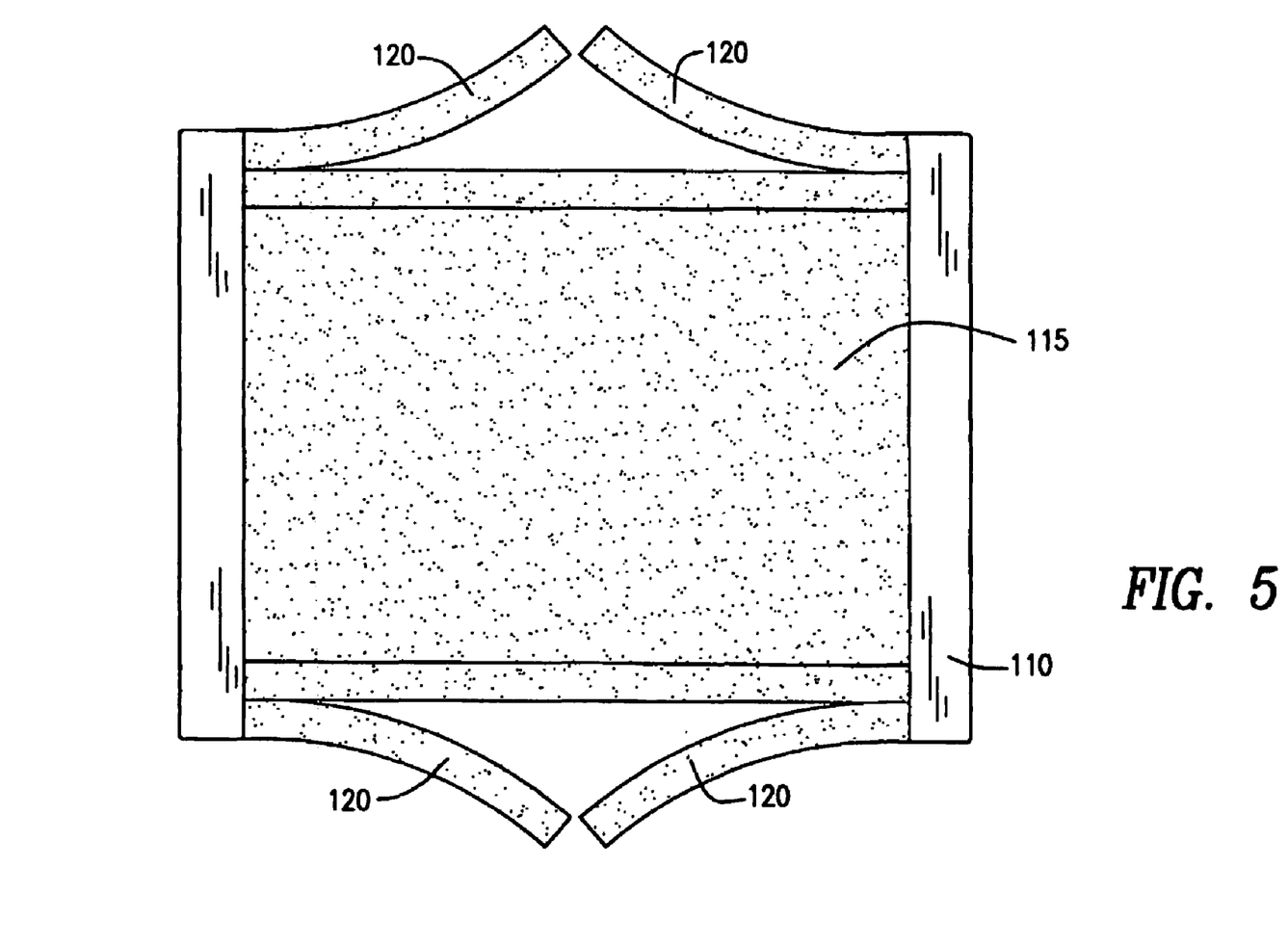
FIG. 5 shows a top plan alternative view of the waste collection pad of FIG. 1.
Figure 6:
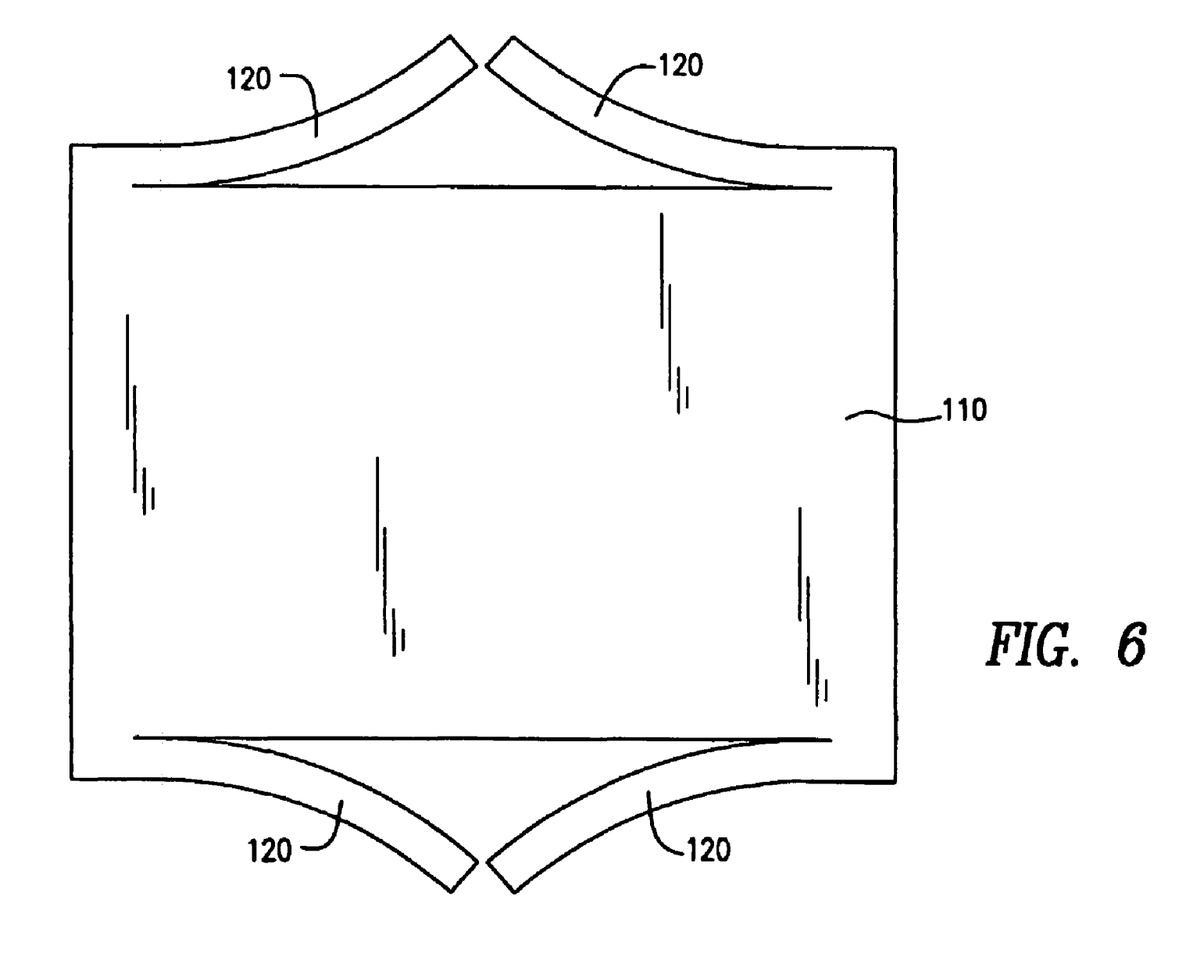
FIG. 6 shows a bottom plan alternative view of the waste collection pad of FIG. 1.
Figure 7:
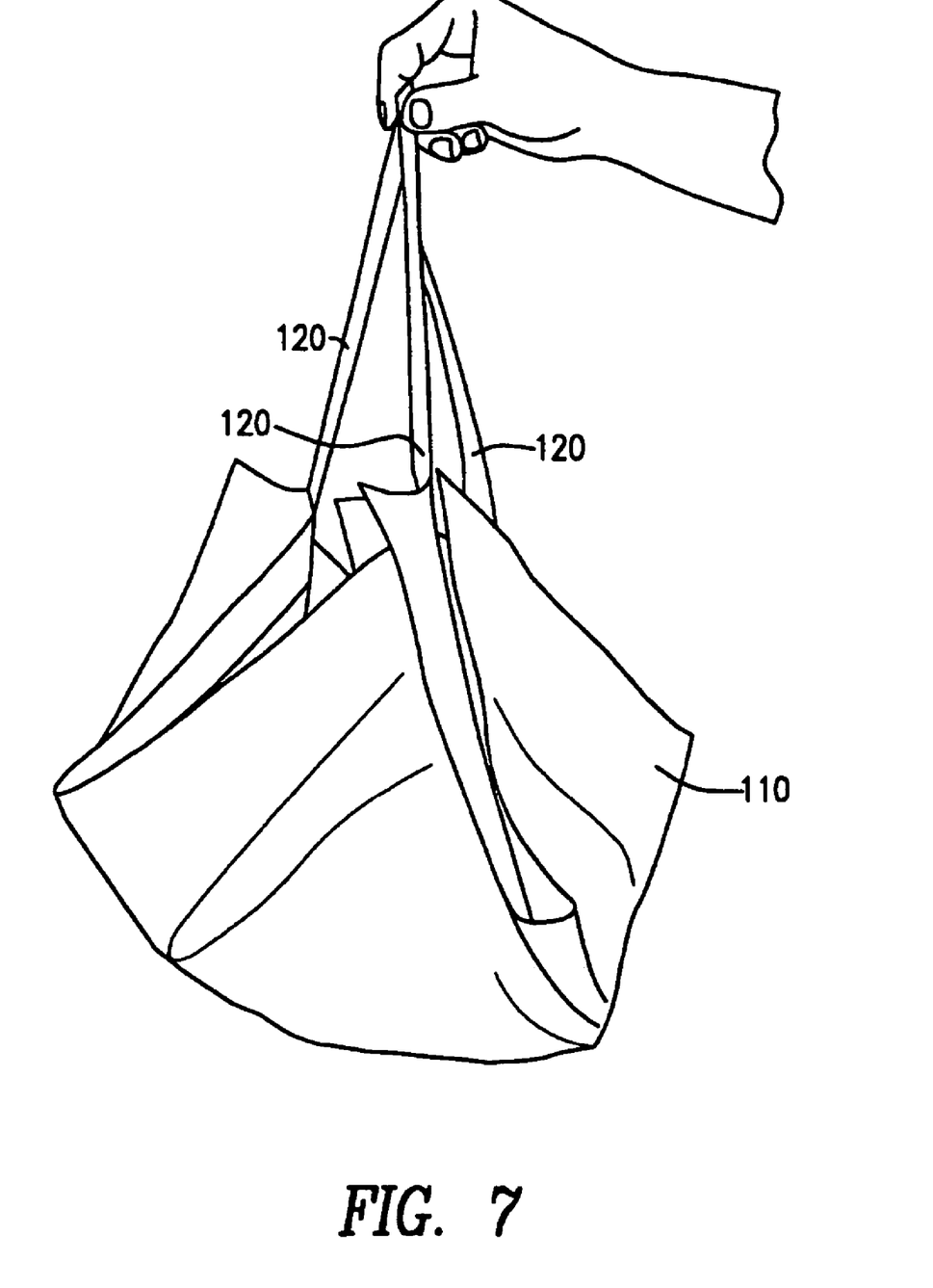
FIG. 7 shows an alternative view of the waste collection pad of FIG. 1.
Figure 8:
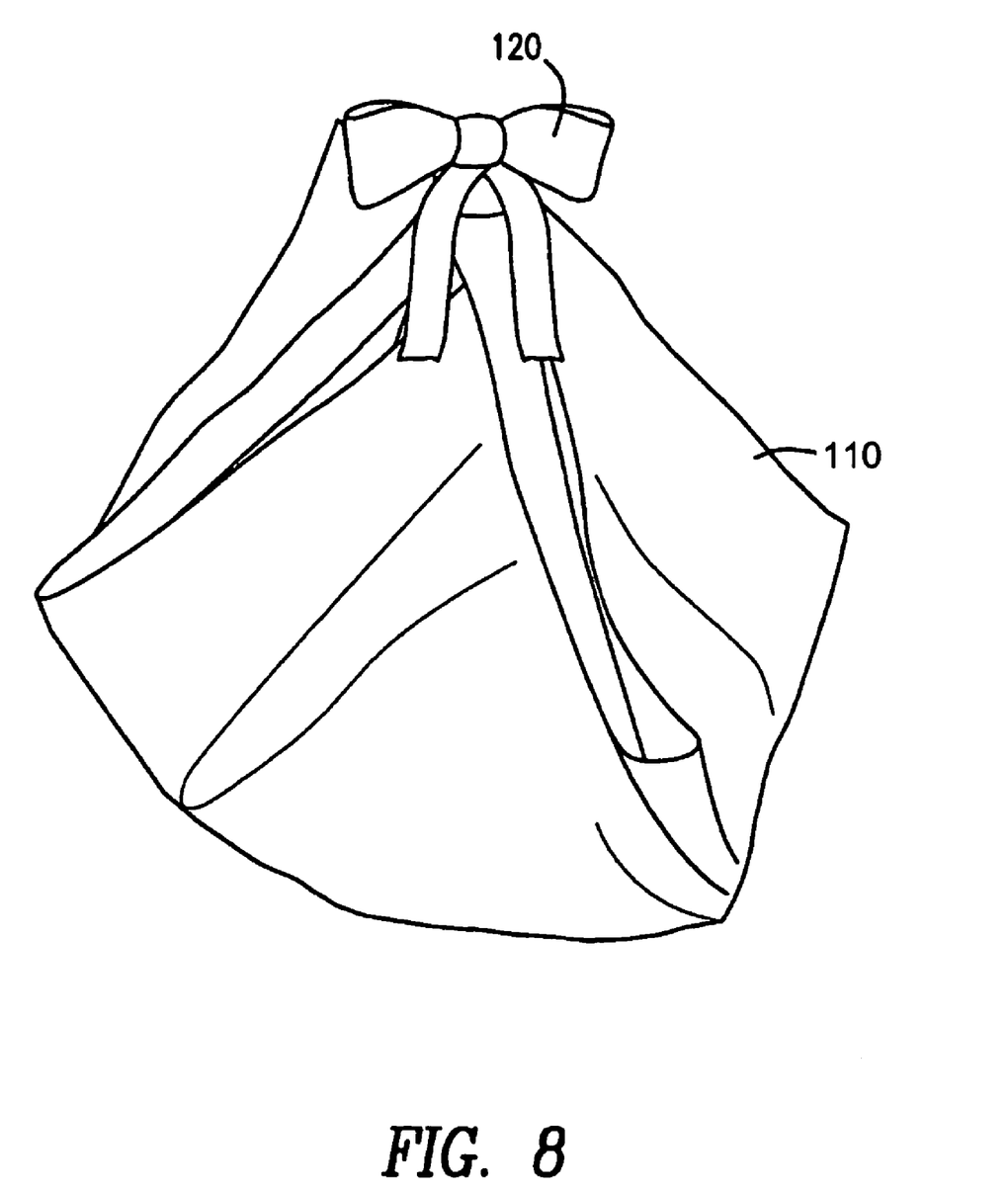
FIG. 8 shows a view of the waste collection pad of FIG. 1 compacted into a bundle for disposal.

Built-in ties or tapes 120 are formed integrally with the pad 100 by perforations 121 and 122 or the like. The ties 120 may be partially detached from a portion of the pad 100 (See e.g., FIGS. 5 and 6) by tearing the pad along the perforations 121 and 122.

Figure 3:
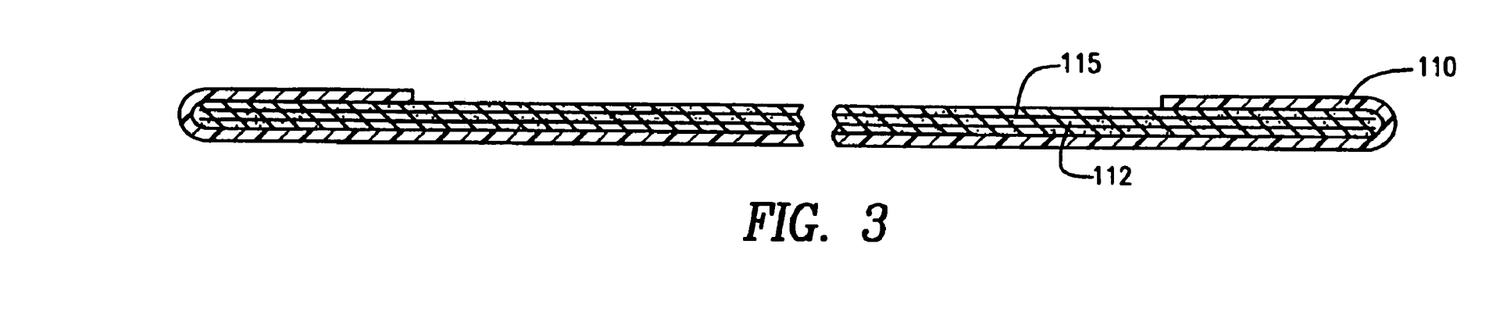
FIG. 3 shows a sectional detail view of the waste collection pad taken along the plane of line 3—3 in FIG. 1.

FIG. 3 shows a sectional detail view of the waste collection pad 100 taken along the plane of line 3—3 in FIG. 1. As shown, the backing sheet 110 exceeds the size of the absorbent 112 and top sheets 115 along side edges 102 and 104, overlaps the edges of the absorbent 112 and top sheets 115 and attaches to the top sheet 115 to seal the backing sheet 110 to the top sheet 115, thereby containing all layers—backing, absorbent and top sheets. The backing sheet 110 is attached to the top sheet 115 by for example, adhesive, welding, heat sealing or other attachment method.

Figure 4:
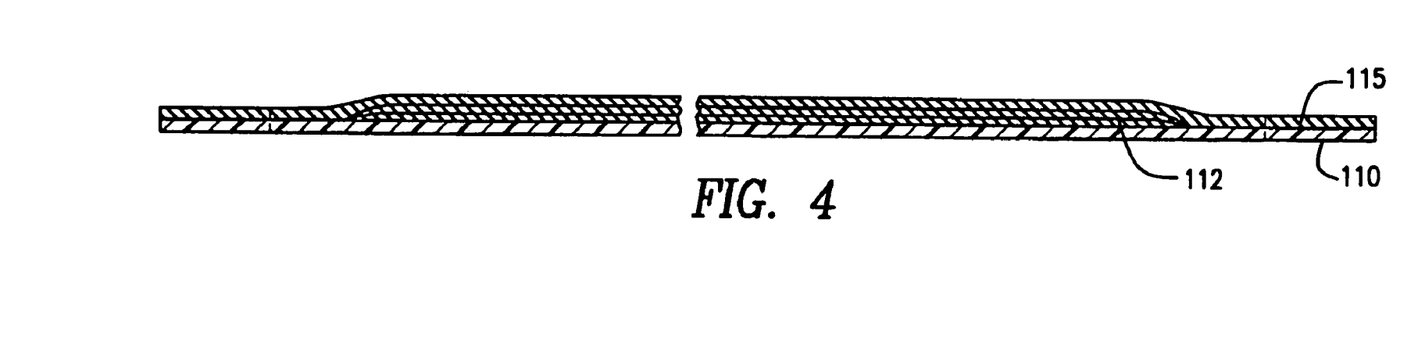
FIG. 4 shows a sectional detail view of the waste collection pad taken along the plane of line 4—4 in FIG. 1.

FIG. 4 depicts a sectional detail view of the waste collection pad 100 taken along the plane of line 4—4 in FIG. 1. As shown, the top sheet 115 exceeds the size of the absorbent sheet 115 in one dimension (i.e., along side edges 106 and 108) and attaches to the backing sheet 110 to seal the top sheet 115 to the backing sheet 110. The top sheet 115 is attached to the bottom sheet 110 by for example, adhesive, welding, heat sealing or other attachment method.

Finally, FIGS. 5 thru 8 depict two views of the waste collection pad 100 wherein the integrated tie means 120 of the pad 100 are opened to create strips or ties to conveniently tie the pad 100 into a compact bundle for disposal.

In an alternate embodiment of the invention, the pad 100 may be impregnated by conventional means with a suitable odor attractant to attract an animal to the pad 100 for the purposes of training the animal to urinate and defecate thereon but which discourages the animal from chewing up and destroying the pad 100. One conventional odor attractant that is suitable for this purpose is allyl phenyl actetate.

In an alternate embodiment of the invention, the pad 100 may be colored green and/or impregnated by conventional means with an odor imparting scent, such as a fresh cut grass scent to attract the animal to the pad 100 for the purposes of training the animal to urinate and defecate outdoors. The backing sheet of the pad 100 may further have a green color to tie into the fresh cut grass scent.

In an alternate embodiment of the invention, the pad 100 may be impregnated by conventional means with an odor deterrent such as a floral scent, to reduce or eliminate for example, the undesirable smell of urine.

In an alternate embodiment of the invention, one or more absorbent sheets 112 of the pad 100 consists of an absorbent polymer which, similar to a baby's diaper, locks in urine and wetness and prevent leakage.

The pad 100 may be manufactured in accordance with the following exemplary process: the pad 100 may be assembled using a continuous process. The pad consists of a poly film moisture barrier (backing sheet 110), a carrier tissue, absorbent fluff, additives, and a top cover tissue (collectively forming absorbent sheet 112), and an abrasion resistant, hydrophilic, non-absorbing top sheet (top sheet 115). The absorbent fluff layer is deposited continuously on the carrier sheet and solid additives, if any, are added to the fluff layer. The top cover tissue is then added to hold the fluff and additives together like a sandwich. This sandwich is then cut into segments shorter than the final pad dimension. Hot melt contact glue is continuously sprayed on to the poly film just prior to the sandwich segments being placed onto the poly film. This results in the sandwich segments being tightly bonded to the poly film moisture barrier. The non-absorbent top sheet is then added to the assembly. The non-absorbent top sheet is tightly bonded by the hot melt contact glue to the poly film layer forming an end seal and the basic structure that will become the built in ties. The poly film layer being wider than the other components is folded over the top sheet and glued to it through the addition of glue in that area of the pad. This forms a side seal to prevent liquid leakage from the pad. Liquid additives, if any, are then sprayed onto the final assembly. The pad is then folded laterally. Because the sandwich segments are shorter than the overall pad dimension, there is an area where only the top sheet and poly film are bonded together. A roll set cuts the process stream into individual pads and simultaneously perforates a pattern that can later be partially detached and used as a tie string (ties 120) for the sanitary disposal of the pads after use. By varying the relative size of the end seal area the tie string size and strength can be varied. The nature of the bonded poly film and top sheet forms a composite structure which has strength that exceeds both the poly film and top sheet separately. After being cut, the pads are then folded in the machine flow direction and discharged for packaging.

Having now described embodiments of the present invention, it should be apparent to those skilled in the art that numerous other embodiments are contemplated as falling within the scope of the present invention as defined by the appended claims and equivalents thereto. For example, it is recognized that the length, width, and thickness of the pad 100 may vary as desired to obtain pads of different shapes, configurations, and stiffnesses. Therefore, all the features disclosed in this specification (including any accompanying claims, abstract, and drawings) may be replaced by alternative features serving the same purpose, and equivalents or similar purpose, unless expressly stated otherwise.

What is claimed is:

1. A pad, comprising:
   a top sheet;
   a backing sheet of fluid impervious material;
   one or more absorbent sheets disposed between said top sheet and said backing sheet; and
   a first frangible element which extends parallel to and partway along opposite sides of one dimension of said pad and a second frangible element located between the edges of said one dimension which extends perpendicular from said first frangible element; said first and second frangible elements forming partially detachable ties in said pad when said first and second frangible elements are disengaged from said pad.

2. A pad as in claim 1 wherein said first and second frangible elements comprise peiforations.

3. A pad as in claim 2 wherein said odor attractant comprises allyl phenyl actetate.

4. A pad as in claim 1 wherein said pad further comprises an odor attracrant impregnated in said pad to attract an animal to said pad for the purposes of training said animal to deposit waste on said pad.

5. A pad as in claim 1 wherein said pad further comprises a fresh cut grass scent impregnated in said pad to train an animal to deposit waste outdoors.

6. A pad as in claim 5 wherein said backing sheet is green to train said animal to deposit waste outdoors.

7. A pad as in claim 1 wherein said pad further comprises an odor deterrent scent to reduce or eliminate the smell of urine.

8. A pad as in claim 1 wherein said one or more absorbent sheets consists of an absorbent polymer which locks in urine and wetness and prevents leakage.

9. A pad, comprising:
   a top sheet;
   a backing sheet of fluid impervious material;
   one or more absorbent sheets disposed between said top sheet and said backing sheet; and
   a first frangible element which extends parallel to and partway along opposite sides of one dimension of said pad and a second frangible element located between the edges of said one dimension which extends perpendicular from said first frangible element said first and second frangible elements forming partially detachable ties in said pad when said first and second frangible elements are disengaged from said pad; wherein said first and second frangible elements comprise perforations.

10. A training pad for encouraging an animal to deposit waste outdoors, comprising:
    a top sheet;
    a backing sheet of fluid impervious material;
    one or more absorbent sheets disposed between said top sheet and said backing sheet; and;
    a grass scent impregnated in said pad to enable said animal to quickly learn to deposit waste outdoors;
    a first frangible element which extends parallel to and partway along opposite sides of one dimension of said pad and a second frangible element located between the edges of said one dimension which extends perpendicular from said first frangible element; said first and second frangible elements forming partially detachable ties in said pad when said first and second frangible elements are disengaged from said pad.

11. A pad as in claim 10 further comprising an odor attractant impregnated in said pad to attract an animal to said pad for the purposes of training said animal to deposit waste on said pad.

12. A pad as in claim 11 wherein said odor attractant comprises allyl phenyl actetate.

13. A pad as in claim 10 wherein said backing sheet is green to train said animal to deposit waste outdoors.

14. A pad as in claim 10 wherein said pad further comprises an odor deterrent scent to reduce or eliminate the smell of urine.

15. A pad as in claim 10 wherein said one or more absorbent sheets consists of an absorbent polymer which locks in urine and wetness and prevents leakage.

16. A pad as in claim 10 wherein said first and second frangible elements comprise perforations.

* * * * *